UNITED STATES PATENT OFFICE.

CARL GOLDSCHMIDT, OF FRANKFORT-ON-THE-MAIN, GERMANY.

VANILLIN PARAPHENETIDIN.

SPECIFICATION forming part of Letters Patent No. 572,890, dated December 8, 1896.

Application filed September 26, 1896. Serial No. 607,094. (No specimens.)

*To all whom it may concern:*

Be it known that I, CARL GOLDSCHMIDT, a subject of the Emperor of Germany, and a resident of Frankfort-on-the-Main, Germany, have invented certain new and useful Improvements in Pharmaceutical Products, of which the following is a specification.

The present invention has for its object a new pharmaceutical product and the mode of preparing the same.

The mode of preparing is as follows: 15.2 parts, by weight, of vanillin are heated with 13.7 parts, by weight, of paraphenetidin, and the resulting liquid is poured into diluted hydrochloric acid, when the product (vanillin) paraphenetidin, separates as a yellow powder, which is recrystallized several times from hot water.

The new product forms yellow crystals which melt at 97° centigrade. It is insoluble in ether, but dissolves somewhat readily in cold water, from which it separates with three molecules of water of crystallization. It dissolves very easily in hot water. It is formed according to the formula:

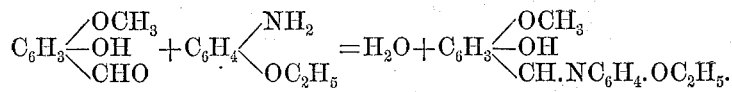

Analysis.

For $C_{16}H_{23}O_6N$.

| Calculated. | Found. |
|---|---|
| C.... 59.07 per cent. | C.... 58.87 per cent. |
| H ... 7.05 per cent. | H ... 6.72 per cent. |
| N ... 4.3 per cent. | N ... 4.10 per cent. |

The new product, called "vanillin paraphenetidin," is designed for medical use, having considerable antineuralgic and soporific properties.

I claim—

1. The herein-described process of manufacturing a new pharmaceutical product by acting upon vanillin with paraphenetidin, substantially as set forth.

2. As an article of manufacture the new pharmaceutical preparation, being vanillin paraphenetidin and having the properties of forming yellow crystals, melting at 97° centigrade, being insoluble in ether, but dissolving somewhat readily in cold water, from which it dissolves with three molecules of water of crystallization, dissolving very easily in hot water.

In testimony whereof I have signed my name to this specification in the presence of two subscribing witnesses.

CARL GOLDSCHMIDT.

Witnesses:
JEAN GRUND,
FRANK H. MASON.